United States Patent [19]
Smith

[11] 3,996,724
[45] Dec. 14, 1976

[54] ROTARY CARTON CLOSING AND SEALING APPARATUS

[75] Inventor: Donald E. Smith, Novi, Mich.

[73] Assignee: Ex-Cell-O Corporation, Troy, Mich.

[22] Filed: Oct. 16, 1975

[21] Appl. No.: 623,136

[52] U.S. Cl. .................................. 53/76; 53/373; 53/379; 53/DIG. 2

[51] Int. Cl.² .................. B65B 57/02; B65B 7/04; B65B 7/06; B65B 51/22

[58] Field of Search ................ 53/373, DIG. 2, 76, 53/75, 77, 379, 388; 156/580, 581, 73; 93/44.1 GT, 44.1 R

[56] References Cited
UNITED STATES PATENTS

| | | | |
|---|---|---|---|
| 2,428,192 | 9/1947 | Berch | 53/373 |
| 2,751,965 | 6/1956 | Miller | 53/76 |
| 3,186,143 | 6/1965 | Borkmann et al. | 53/379 |
| 3,280,535 | 10/1966 | Reimers et al. | 53/379 |
| 3,370,399 | 2/1968 | Egleston | 53/379 |
| 3,494,817 | 2/1970 | Whitecar | 156/580 X |
| 3,905,280 | 9/1975 | Egleston et al. | 93/44.1 R |
| 3,910,014 | 10/1975 | Braun | 53/373 |

Primary Examiner—Travis S. McGehee
Assistant Examiner—Horace M. Culver
Attorney, Agent, or Firm—Reising, Ethington, Barnard Perry & Brooks

[57] ABSTRACT

Packaging apparatus for closing and sealing the open end of a carton of thermoplastic coated paperboard material or the like. A rotatable drum has a cylindrical wall that supports a plurality of carton closing and sealing units. During rotation of the drum, open ended cartons are successively picked-up at a carton receiving station and are carried by the drum to a carton delivery station. During the movement of the carton from the receiving to the delivery station, the open end of the carton is folded to a closed condition and the layers of the closed carton end are vibration welded together by one of the carton closing and sealing units. Each carton closing and sealing unit includes a pair of jaws movable between an open and closed position with respect to each other, a latching member for locking the jaws in their closed position, and a vibration welding device. When the jaws are in their open position, the open end of a carton can be received between the jaws, and subsequent closing of the jaws collapses the open end of the carton, with an anvil surface on one of the jaws being disposed to engage one outer surface of the layers of the closed carton end. The vibration welding device includes a horn that vibrates at a predetermined frequency when energized and that extends into engagement with the closed end of the carton to clamp the layers of the closed end of the carton between the surface of the horn and the anvil surface of the jaws to vibration weld the layers together. A jaw operating cam causes the jaws to move between their open and closed positions during rotation of the drum. When the jaws move to their closed position, the latching member moves to its locked position, and a latching member holding cam prevents the latching member from moving from its locked position until the welding operation is completed and the carton approaches the carton delivery station. A latching member release cam is engaged by the latching member as the carton approaches the delivery station to prevent the latching member from remaining in its locked position as the carton approaches the delivery station.

38 Claims, 13 Drawing Figures

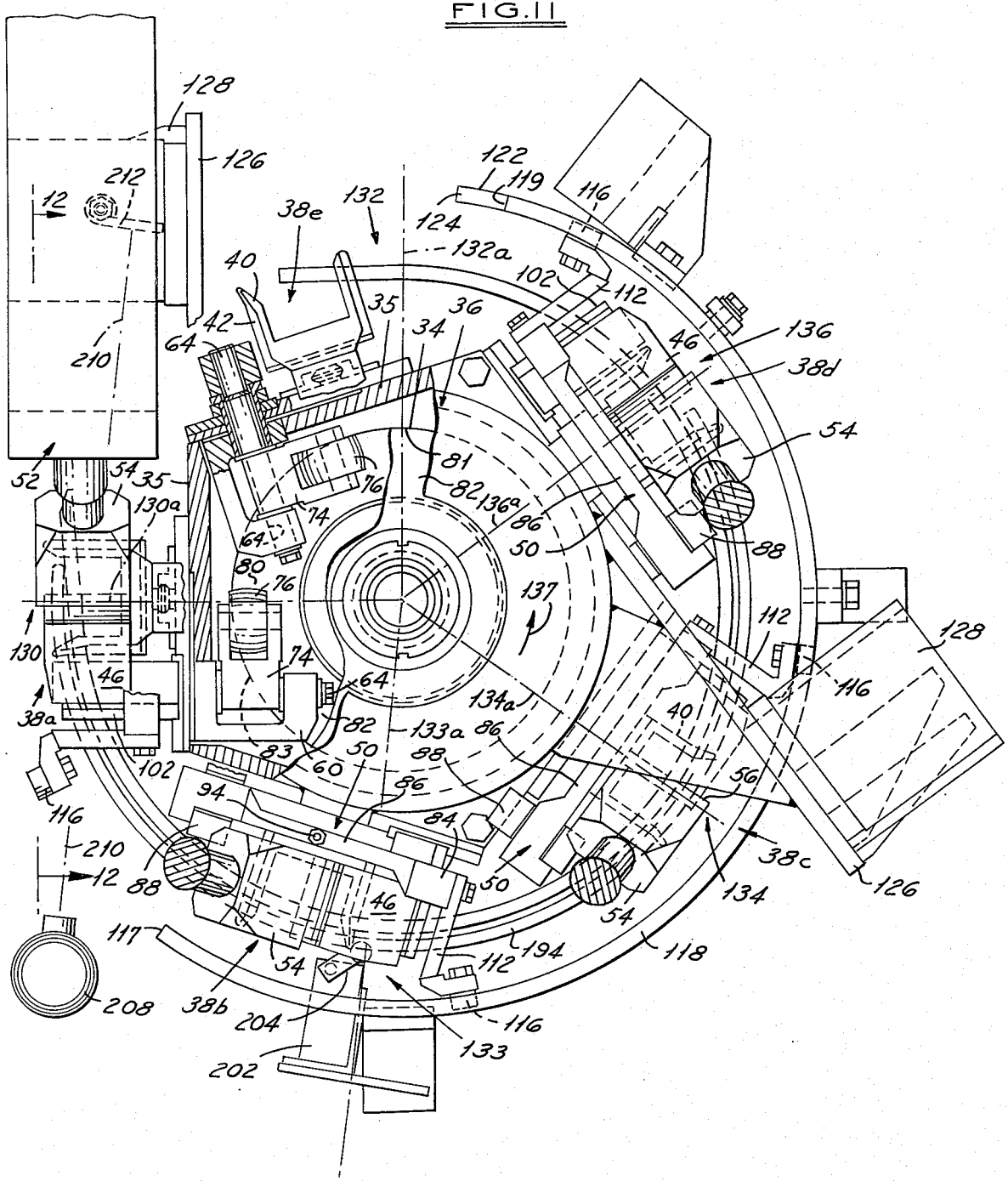

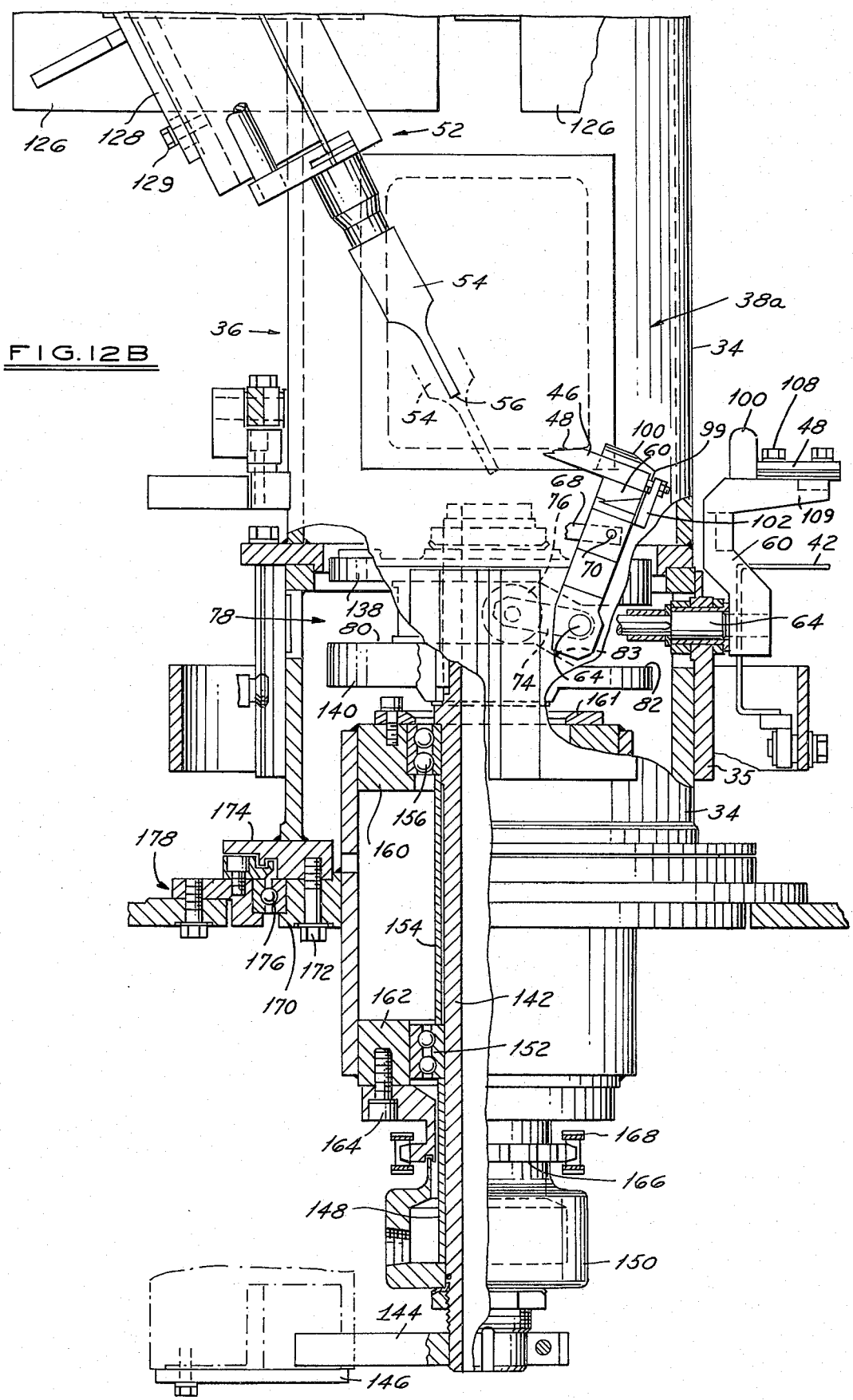

ROTARY CARTON CLOSING AND SEALING APPARATUS

BACKGROUND OF THE INVENTION

1. Field of the Invention

This invention relates generally to packaging apparatus, and is particularly concerned with apparatus for closing and sealing the ends of containers of thermoplastic coated paperboard material, or the like, by vibration welding.

2. Description of the Prior Art

Until recently, the conventional manner of sealing cartons or containers of thermoplastic coated paperboard material, or the like was to prebreak the end closure panels of the container and then apply sufficient heat to activate the thermoplastic coating of the various closure panel areas and then bring them together to heat seal them in a closed position. When the thermoplastic material cools and sets, the layers are sealed and adhesively secured together. In addition to requiring the use of elaborate and expensive apparatus for generating the considerable amount of heat energy required, elaborate apparatus, methods and systems are also required to dissipate the excess heat from the plant in which the packaging operation is being carried out. Examples of this general type of packaging apparatus are shown in U.S. Pat. Nos. 3,002,328; 3,120,089; 3,166,994; 3,187,647; 3,239,995 and 3,309,841.

U.S. Pat. Nos. 3,905,280 of Sept. 16, 1975 and 3,910,014 of Oct. 7, 1975 disclose apparatus for sealing the ends of thermoplastic coated paperboard container by vibration welding wherein mechanical energy is converted into localized heat energy to minimize the amount of heat and energy required, and to eliminate the necessity for expensive systems and methods for dissipating the excess heat. U.S. Pat. No. 3,526,792 discloses a transducer having a converter for converting electrical energy into mechanical energy, and a concentrating horn for concentrating the mechanical energy into vibrations at a desired frequency. In the above mentioned U.S. Pat. Nos. 3,905,280 and 3,910,014, the concentrating horn of the vibration welding apparatus vibrates at a predetermined frequency (determined generally by the configuration of the horn) when energized, and cooperates with an anvil or back-up member to clamp the layers of the thermoplastic coated paperboard between the working surface of the horn and the back-up surface of the anvil. When the layers of the thermoplastic coated paperboard material are clamped between the horn and anvil, the vibration of the horn activates the thermoplastic coating to cause the thermoplastic material to flow so that when the vibration is terminated, the thermoplastic material will cool and set to form a seal between the layers and adhesively secure the layers together throughout the area of the seal. Among the advantages of the utilization of vibration welding is that the heat generated by the vibration of the horn is concentrated in the area to be sealed, and little excess heat is required to be generated to perform the welding operation thus eliminating the requirement for some of the elaborate apparatus for dissipating the excess heat.

The above referred to U.S. Pat. Nos. 3,905,280 and 3,910,014 disclose apparatus for closing and sealing thermoplastic coated paperboard containers or cartons both of the type having a so-called "gabled" top having, in its closed condition, upwardly inclined panels projecting from the top edges of the sides of the container, as well as such containers having a flat top. Both types of containers generally have a tubular body, of rectangular or other cross section, with an end closure having front, rear and side panels that extend axially from the tubular body when the end closure is in is fully open position. The end closure is generally folded by closing means to a closed position with the side panels at least partially collapsed between the front and rear panels, and with sealing strips projecting axially outwardly from the front, rear and side panels of the end closure. With a flat top container, the front and rear panels of the end closure lie substantially flat and transversely of the tubular body when the end closure is closed with the side panels collapsed beneath the front and rear panels, and the sealing strips and a closure flap on the panels (as shown in U.S. Pat. No. 3,910,014) projecting axially outwardly from the container body at the junction between the front and rear panels. The sealing strips are then welded together to seal the end of the container and secure the end closure in its closed condition. With a gabled top container, the front and rear panels are inclined with respect to the axis of the tubular body of the container as mentioned above.

In the apparatus disclosed in U.S. Pat. No. 3,910,014, the cartons or containers are sequentially conveyed through a closing station, a welding station, and a closure flap heating, folding and welding station. A pair of opposed closing jaws are located at the closing station, which closing jaws are movable toward each other from an open position to a closed position to fold the open end closure panels of a container received therebetween to the closed condition. An anvil and vibration welding device is located at the welding station. When a container moves to the welding station from the closing station, a vibrating horn extends from the vibration welding device and engages one outer surface of the sealing strips while forcing the other outer surface of the sealing strips into engagement with the anvil. The horn vibrates at a frequency sufficient to activate the thermoplastic material to flow. When the thermoplastic material cools and sets, the layers of the sealing strips are welded together and the end of the container is sealed. The container then moves to the closure flap heating, folding and welding station where the closure flap is heated and folded flat over the closed top.

SUMMARY OF THE INVENTION

An object of the present invention is to provide packaging apparatus for closing and sealing the end of a container or carton of thermoplastic coated paperboard material or the like by means of vibration welding at a high rate of production.

A further object is to provide apparatus for closing and sealing the end of a container or carton of thermoplastic coated paperboard material or the like by vibration welding wherein the carton is continuously moving at high speed during the closing and sealing operation.

A further object is to provide packaging apparatus for closing and sealing the end of a carton or container of thermoplastic coated paperboard material, or the like, by vibration welding wherein the cartons are transferred from one location to another, and wherein an open end of the carton is closed and sealed by vibration welding during the time the carton is continuously moving from one to the other location.

A further object is to provide packaging apparatus for closing and sealing the end of a carton or container of thermoplastic coated paperboard material, or the like, by vibration welding, wherein the anvil or back-up member for the vibrating horn functions also as a closing member for closing the open end of the carton prior to the vibration welding operation.

In carrying out the foregoing, and other objects, the present invention is embodied in apparatus for closing and sealing the open end of a container or carton of thermoplastic coated paperboard material or the like, the apparatus including a carton closing and sealing unit having a pair of jaws that open and close, a latching member for holding the jaws closed, and a vibration welding device. At least one of the jaws also comprises an anvil or back-up member for the vibration welding device and has an anvil surface formed thereon for supporting one outer surface of the layers of an end of the carton to be sealed. The jaws are supported for movement with respect to each other between an open position for receiving an open end of a carton and a closed position to cause the open end of the carton to be folded to a closed condition. The vibration welding device includes a horn that vibrates at a predetermined frequency when energized, the horn being movable relative to the jaws between a retracted, inactive position and an extended sealing position. The horn has a work surface that engages the opposite outer surface of the layers of a closed carton end from the surface engaged by the anvil surface of the anvil jaw when the jaws are in the closed position. The layers of the closed end of the carton are thus clamped between the work surface of the horn and the anvil surface of the jaws so that the layers are welded together upon vibration of the horn.

To provide additional support for the anvil surface during the welding operation, a latch member is supported for movement between a locked position and a released position. In the locked position of the latch member, it engages the jaw that functions as the anvil in the closed position of the jaws and prevents the jaws from moving to the open position.

The jaws are connected with a jaw operating cam in such a manner that relative movement between the jaws and the jaw operating cam causes the jaws to open and close.

The latching member is prevented from moving to its released position by a holding cam movable relative to the latch member and engageable with the latch member during the time that the jaws are required to be closed for the welding operation. When the welding operation is completed, a release cam is engageable by the latch member to actuate the latch member to its released position and permit the jaws to move to their open position to allow removal of the carton from between the jaws.

A drum is rotatably mounted on a supporting post, and a plurality of carton closing and sealing units are supported on the drum, the carton closing and sealing units sequentially engaging a carton at the carton receiving station, closing the open end of the carton, and vibration welding and sealing the closed end as the carton is carried to the carton delivery station. Each carton closing and sealing unit is operable to perform a cycle of engaging a carton at the receiving station and carrying it to the delivery station while simultaneously closing and sealing an open end of the carton with each revolution of the drum.

Other objects, advantages and features of the invention will become apparent from the following description taken in connection with the accompanying drawings.

DESCRIPTION OF THE DRAWINGS

FIG. 11 is a top plan view, with certain parts broken away, of the apparatus of FIG. 6; and FIGS. 12A and 12B are front elevations of the upper and lower portions of the apparatus of FIG. 6 as viewed approximately along lines 12—12 of FIG. 11, portions of the apparatus being broken away to expose internal parts.

DETAILED DESCRIPTION OF THE PREFERRED EMBODIMENTS

Figure 1:
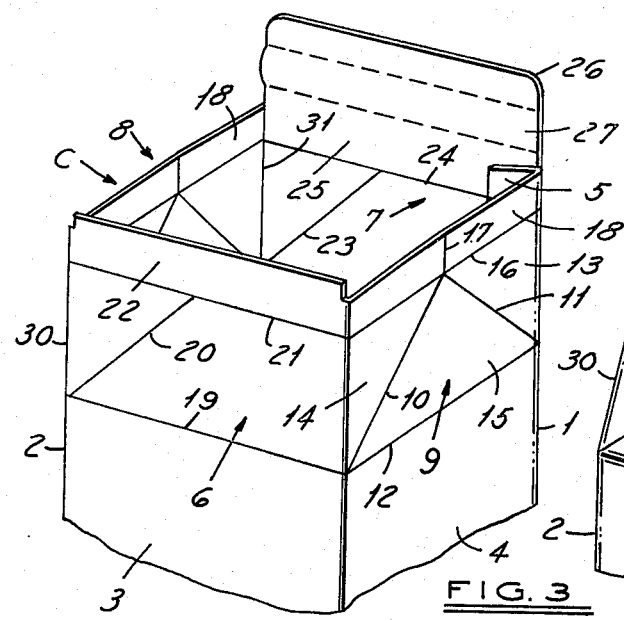
FIG. 1 is a perspective view of a portion of a container of thermoplastic coated paperboard material, or the like, with the container end closure portion in a fully open position.

FIGS. 1 through 5 illustrate a carton of thermoplastic coated paperboard material, or the like, having an end closure that can be folded to form a flat top container. However, it should be understood that the present invention can be utilized to close and seal cartons and containers having different configurations, such as cartons having a gabled top configuration as illustrated, for example, in U.S. Pat. No. 3,905,280, as well as containers or cartons having various other configurations.

With reference to FIGS. 1 through 5, the container is designated collectively by reference character C. The container C is provided with a thermoplastic coating, and may be made of paperboard, or the like, coated with polyethylene or other thermoplastic material. The container C is made from a blank of the thermoplastic coated paperboard, and may be erected from the blank into the form shown in FIG. 1 by prior art machinery of the type disclosed in, for example, U.S. Pat. Nos. 3,002,328; 3,166,994; 3,187,647; 3,239,995 and 3,309,841.

The body of the carton C is of tubular configuration having a rectangular cross section with four body side panels indicated by reference numerals 1, 2, 3 and 4 with a sealing flap or panel indicated by reference numeral 5. The flap 5 is bent inwardly from the side panel 4 and sealed to the inner surface of the side panel 1. The top end closure portion of container C is shown in its fully open position in FIG. 1, and includes front, rear and side end closure panels 6, 7 8 and 9, respectively. In the fully opened position of FIG. 1, the end closure panels 6, 7, 8 and 9 project axially from the tubular body of the container. The side panels 8 and 9 are formed into three triangular segments 13, 14 and 15 by scored lines 10, 11 and 12. The triangular segment 15 constitutes a central segment with one side extending along the scored line 12 at the upper end of the respective side panel of the body of the container.

Formed at the upper end of the side panel 9 and separated from the triangular segments by a scored line 16 is a sealing strip or rib 18. The center of the sealing strip 18 is provided with a scored line 17 to define an inwardly projecting corner for overlapping engagement with the corresponding corner 17 of the side panel 8 when the top closure portion is folded and sealed to its closed position as is described in greater detail below.

The front panel 6 has a scored line 20 defining a triangular segment adjacent to the side panel 8 which cooperates therewith to define a pouring spout when the container is opened after being filled. The lower edge of the front end closure panel 6 is connected with the panel 3 of the body by a scored line 19, and the upper edge of the front panel has a sealing strip 22 projecting therefrom, the lower edge of the sealing strip 22 being defined by a scored line 21.

The rear end closure panel 7 has a scored line 23 corresponding to the scored line 20 on the front panel 6 to define a triangular segment adjacent to the side closure panel 8. The rear closure panel 7 also has a sealing strip 25 projecting from a scored line 24 at the upper edge of the rear closure panel 7. Projecting upwardly from the sealing strip 25 is a closure flap 26 formed intermediate its ends with a tear strip 27. The tear strip 27 is defined between two lines of a series of perforations.

Figure 5:
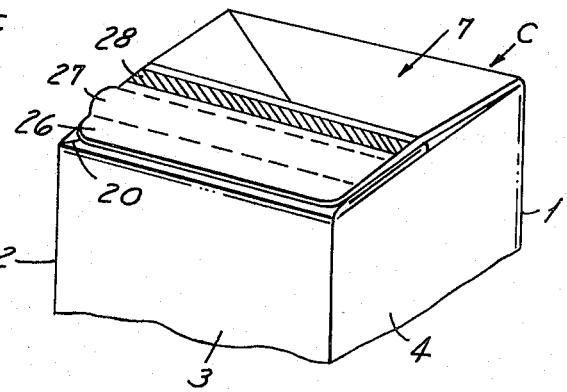
FIG. 5 is a view of the container of FIGS. 1-4 with the closure flap folded flat and adhesively secured to the top of the container.

When the container C has been erected from the blank with the end closure portion in the fully open position illustrated in FIG. 1, in which fully open position it extends axially from the tubular body of the carton, the closure portion can be closed, sealed and folded to the position shown in FIG. 5 in which the end of the container is flat with the front and rear closure panels 6 and 7, respectively, lying flat across the end of the container with the closure flap 26 adhered to and overlying the front panel 6. When the tear strip 27 is removed, the edges 30 and 31 of the closure portion can be pushed upwardly to break the seal 28, and the triangular segments 13, 14 and 15 of the side panel 8, in cooperation with the triangular segments defined by the scored lines 20 and 23 on the front and rear panels 6 and 7, respectively, will define a pouring spout.

During the filling and closing of the top closure portion of the carton C, the carton undergoes several operations including a "prebreaking" step or operation, by which is meant that the side panels 7 and 8 are bent slightly inwardly to initially bend the triangular segments along the scored lines 10, 11, 12 and 17 so that the side panels will collapse inwardly as the front and rear panels are moved toward each other. The prebreaking operation may take place either prior to or subsequent to filling the container with milk or other contents, a prebreaking operation being disclosed in the aforementioned U.S Pat. No. 3,910,014.

Figure 2:
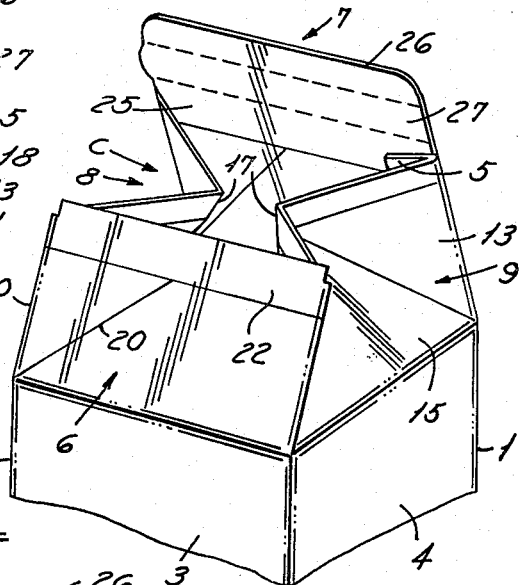
Figure 3:
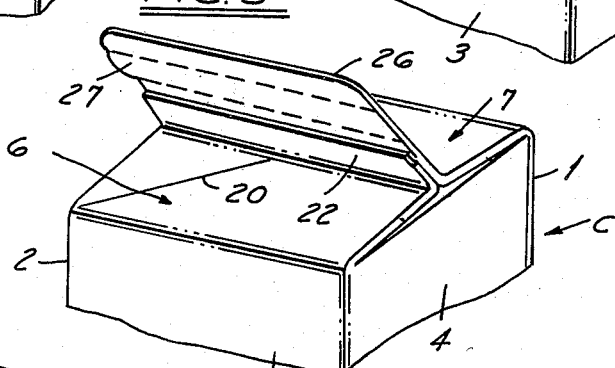
FIG. 3 is a perspective view of the container of FIGS. 1 and 2 with the end closure portion in the closed condition with a closure flap and sealing strips projecting generally axially from the closed end prior to the sealing operation.

After the prebreaking operation, the front and rear closure panels 6 and 7 are bent toward each other as shown in FIG. 2 to cause the side panels 8 and 9 to collapse inwardly beneath front and rear panels 6 and 7. The closing operation continues until the lower edges of the sealing strips 18, 22 and 25 along the scored lines 16, 21 and 24 are brought together such that the front and rear panels 6 and 7 lie substantially flat across the end of the container as shown in FIG. 3. With the panels in the position shown in FIG. 3, the sealing strips are vibration welded together along the band indicated by the shaded area 28 in FIGS. 4 and 5. Following the vibration welding operation, the closure flap 26 is heated on its outer end on the surface adjacent to the front panel 6, after which the closure flap, together with the sealing strips 18, 22 and 25, are folded downwardly until the closure flap 26 assumes the position shown in FIG. 5. The operation for heating and folding the closure flap 26 to the position shown in FIG. 5 can be carried out in the manner disclosed, for example, in U.S. Pat. No. 3,910,014.

Figure 4:
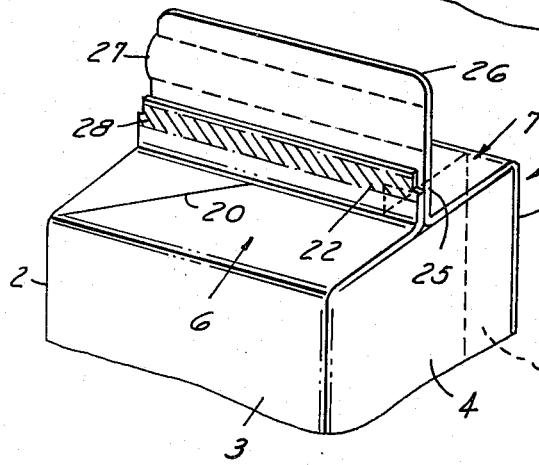
FIG. 4 is a perspective view of the container after the sealing strips have been sealed together by vibration welding.

The present invention is concerned primarily with the closing and welding operation, that is, the operation performed subsequent to the prebreaking operation, the results of which are illustrated in FIG. 2, and prior to the flap closure and sealing operation, the results of which are illustrated in FIG. 5. The present invention is concerned with performing, at high speed, the operation by which the end closure 8 is folded from the prebreak condition of FIG. 2 to the closed position of FIG. 3, and then is vibration welded along the band 28 as illustrated in FIG. 4. Apparatus embodying the present invention for carrying out this operation is illustrated in FIGS. 6 through 12B.

Figure 6:
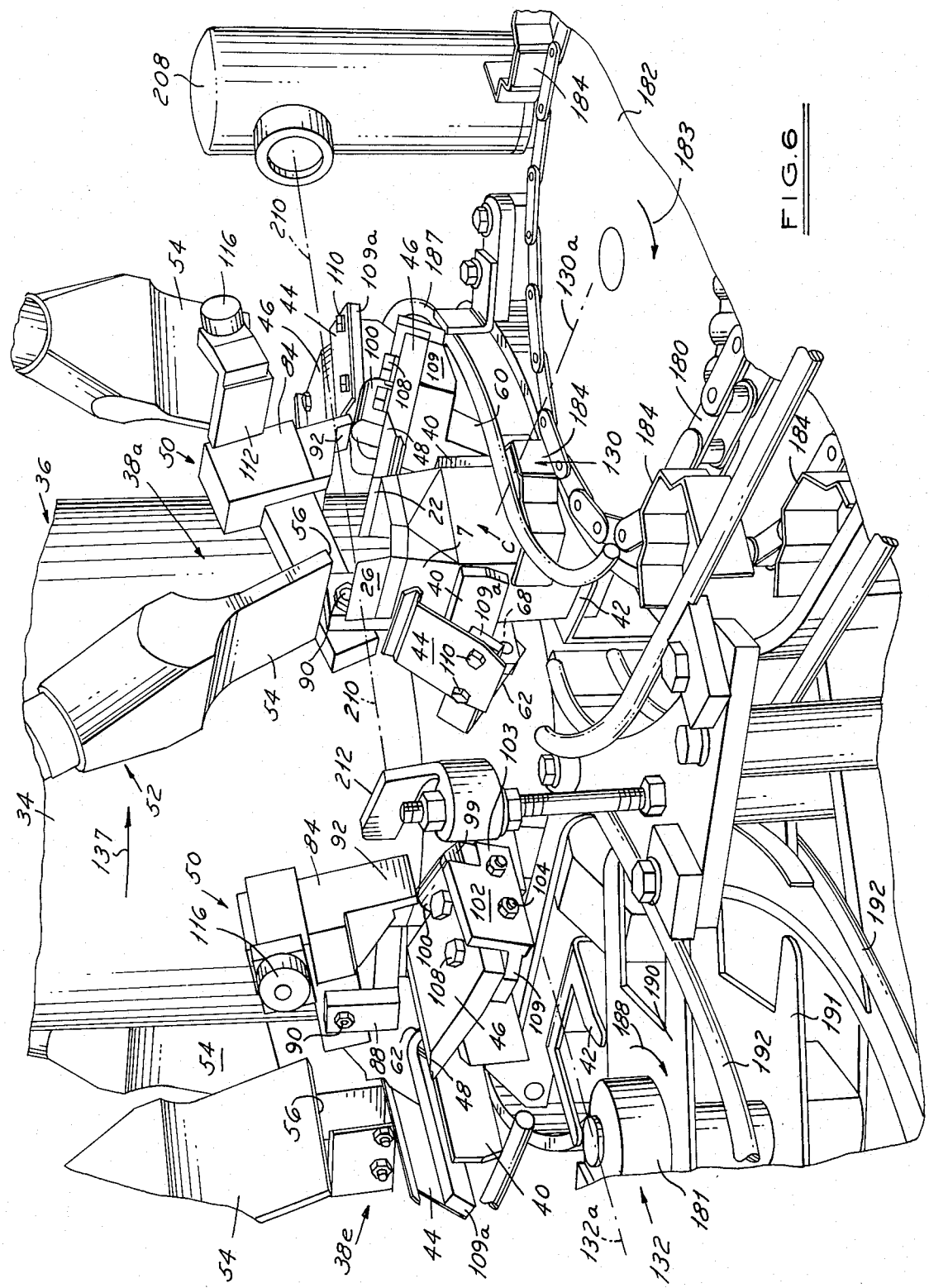
FIG. 6 is a perspective view of a portion of packaging apparatus embodying the present invention.

With reference to FIGS. 6 and 11, reference numeral 36 indicates a rotatable drum having a cylindrical side wall 34 constituting a supporting wall for a plurality (5 in the illustrated embodiment) of carton closing and sealing units. Each of the carton closing and sealing units is indicated collectively by reference numerals 38, the individual units being designated by reference numerals 38a, 38b, 38c, 38d and 38e. Each of the illustrated carton closing and sealing units 38 includes an upper, U-shaped carton carrying bracket 40 secured to the supporting wall 34, and a lower, U-shaped carton carrying bracket 42 also secured to the supporting wall 34 of the drum 36 by a mounting plate 35. Each of the carton closing and sealing units also includes a pair of carton end closing jaws 44 and 46, a latch member 50, and a vibration welding device indicated collectively by 52, the vibration welding device including a horn 54 that vibrates at a predetermined frequency when energized. The jaw 46 also functions as an anvil or back-up member for the horn 54, and is therefore of heavier construction than the jaw 44. The anvil jaw 46 is formed with an anvil surface 48. The anvil surface 48 cooperates with the outer end, or working surface 56 of the horn 54 to vibration weld the layers of the closure portion of the container C together in the manner described in detail below.

The vibration welding device 52 may be of the type disclosed in the above mentioned U.S. Pat. Nos. 3,905,280 and 3,910,014. The vibration welding device 52 may include a transducer of the type disclosed in U.S. Pat. Nos. 3,432,691 and 3,526,792 wherein electrical energy is converted into mechanical energy. The horn 54 converts the mechanical energy into vibrations at a desired frequency. When the end or working surface 56 of the horn 54 engages one outer surface of the overlapped layers of the end closure portion of the carton C, with the other outer surface being engaged by the anvil surface 48, the vibration of the horn generates heat sufficient to activate the thermoplastic coating of the carton to flow. After the horn stops vibrating, the thermoplastic material cools and sets to weld the sealing strips 22 and 25 together along the band 28 as shown in FIG. 4. A housing 58 of the device 52 encloses the transducer, and the horn 54 is supported in the housing 58 for movement between a retracted, inactive position illustrated, for example, in FIG. 8, and an extended, sealing position, illustrated in FIG. 9.

Figure 7:
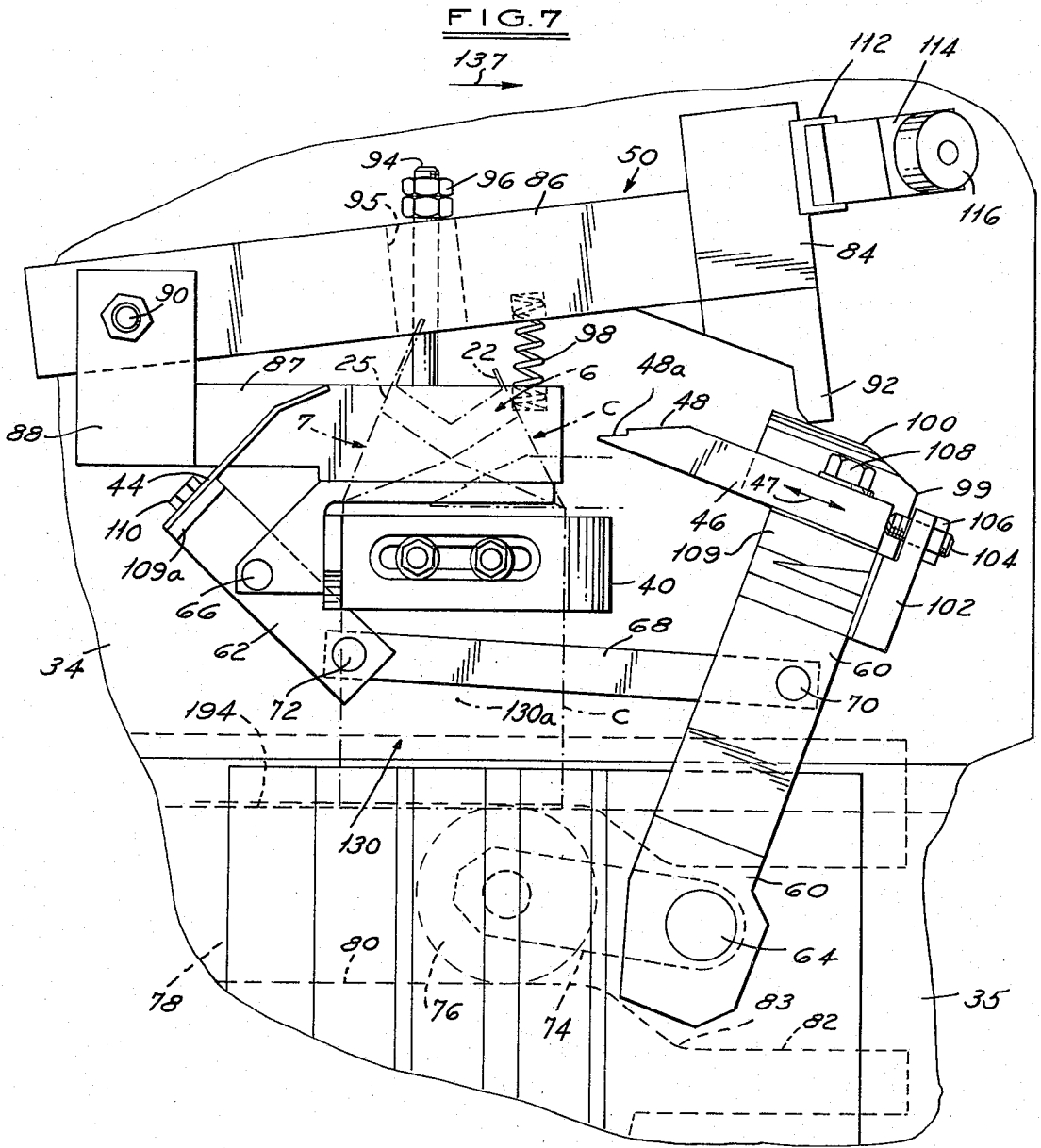
FIG. 7 is an enlarged, elevational view of a portion of the apparatus of FIG. 6 with the parts shown in one position.
Figure 8:
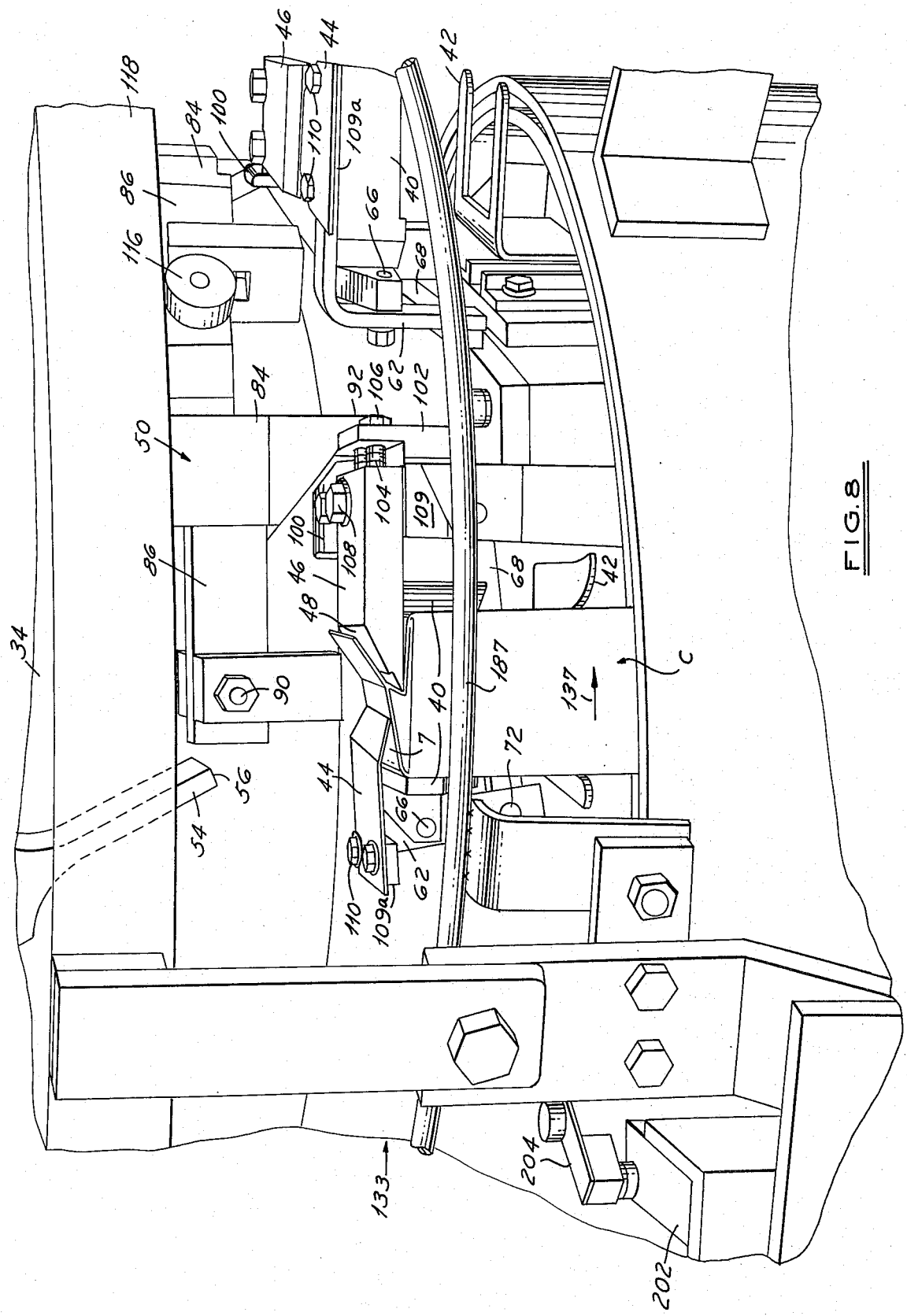
FIG. 8 is a perspective view of another portion of the apparatus of FIG. 6 with the parts of FIG. 7 shown in a different position.
Figure 9:
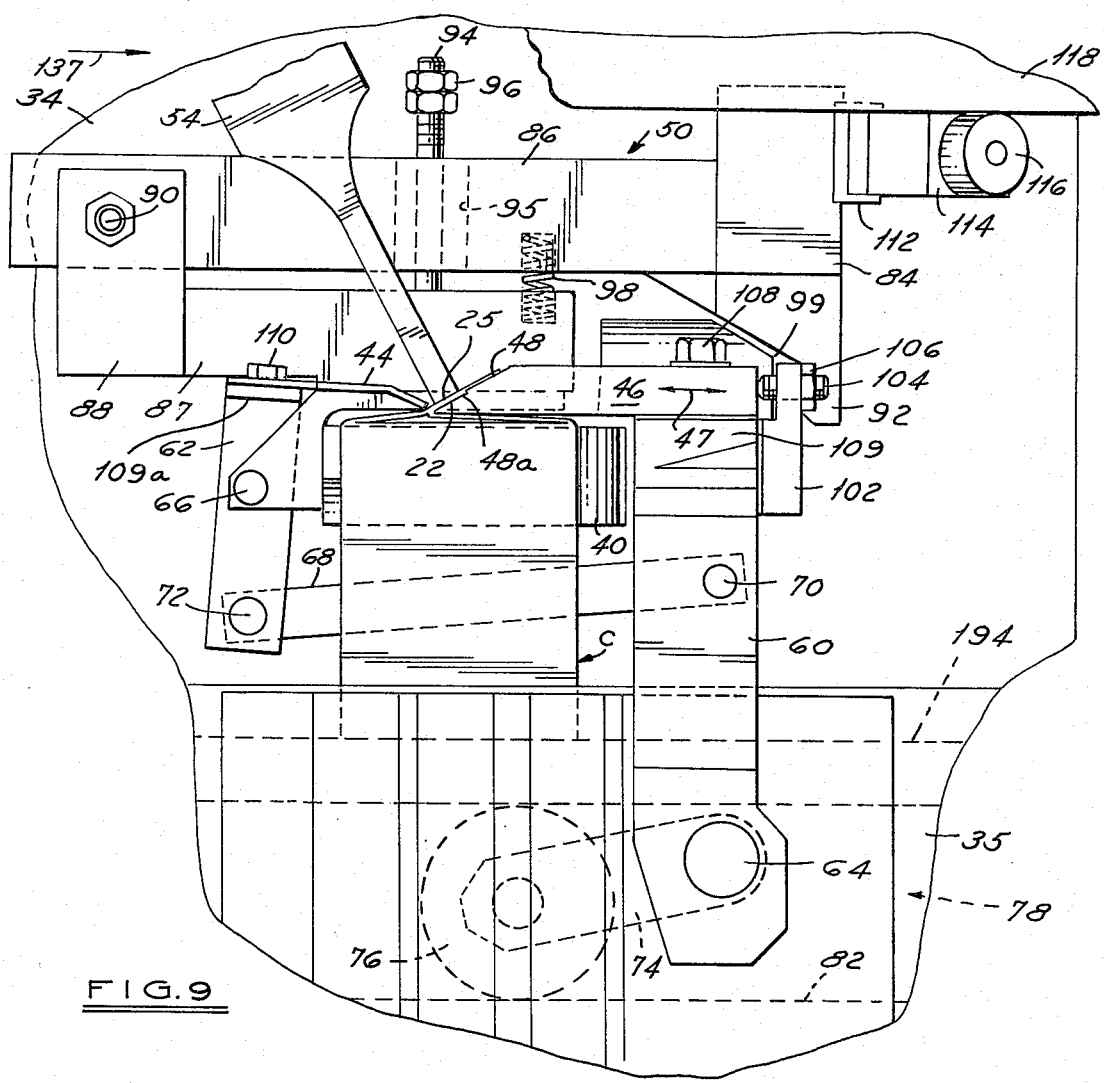
FIG. 9 is a view similar to FIG. 7 with the parts shown in a different position.

The jaws 44 and 46 are supported for movement with respect to each other between an open position (illustrated, for example, in FIGS. 6 and 7), and a closed position (illustrated, for example, in FIGS. 8 and 9). In the open position, the jaws can receive the open end of the carton C, that is, the end of the carton C as in the condition illustrated approximately in FIG. 2 after having undergone a prebreaking operation with the panels 6 and 7 bent slightly toward each other. As the jaws 44 and 46 move to the closed position of FIGS. 8 and 9, the open end of the carton C is folded closed with the outer surface of the sealing strip 22 disposed to be engaged with the anvil surface 48 of jaw 46. When the jaws 44 and 46 are in the closed condition illustrated in FIGS. 8 and 9, the horn 54 can move from its retracted, inactive position illustrated in FIG. 8 to its extended sealing position illustrated in FIG. 9 so that the work surface 56 of the horn engages the outer surface of the sealing strip 25 of the carton so that the sealing strips 22 and 25, with the sealing strips 18 folded therebetween, are clamped between the anvil surface 48 and the working surface 56 of the horn 54, whereupon vibration of the horn 54 welds the sealing strips together along the band 28. The anvil surface 48 may be stepped as indicated by reference numeral 48 as to accommodate variations in the thickness of layers clamped between the horn and anvil surface.

As the jaws move from the open position of FIGS. 6 and 7 to the closed position of FIGS. 8 and 9, the latch member 50 moves from a released position shown in FIGS. 6 and 7 to a locked position shown in FIGS. 8 and 9. In the locked position of the latching member 50, the latching member 50 engages jaw 46 to lock the jaws 44 and 46 against movement from their closed positions and provides an additional back-up for the horn 54 during the vibration welding operation.

The means for supporting the jaws 44 and 46 for movement between the open and closed positions of FIGS. 7 and 8, respectively, includes a first support lever 60 secured to jaw 46, and a second support lever 62 secured to the jaw 44. The first support lever 60 is pivotally mounted on the supporting wall 34 of the drum 36 by a first pivot pin or shaft 64, and the second support lever 62 is pivotally supported with respect to the supporting wall 34 by a second pivot pin 66 spaced from the pivot pin 64. A connecting or motion transmitting link 68 has one end pivotally connected by a pin 70 with lever 60 at a location spaced from pin 64, and its other end pivotally connected by a pin 72 with lever 62 at a location spaced from pin 66. Consequently, as viewed in FIGS. 7 and 9, for example, clockwise movement of the first support lever 60 about pivot pin 64 causes the jaws 44 and 46 to move in an opening direction with respect to each other; conversely, counterclockwise movement of the first support lever 60 about pin 64 causes the jaws 44 and 46 to move in a closing direction with respect to each other.

The shaft or pivot pin 64 is rotatably mounted in the mounting supporting wall 34, and the support lever 60 is nonrotatably secured to pin 64. Nonrotatably secured to the pin 64 on the opposite side of the supporting wall 34 from lever 60 is a jaw operating drive lever 74. A jaw operating cam follower 76 is rotatably mounted on the end of drive lever 74 opposite its connection with pin 64. The jaw operating cam follower 76 is received in a cam track 78 having an upper portion 80 and a lower portion 82. The entrance end of the upper portion 80 of the cam track 78 is indicated by reference numeral 81 in FIG. 11, and the exit end of portion 80 is indicated by reference numeral 83 in FIGS. 7 and 11; conversely, the entrance and exit ends of the lower portion 82 of cam track 78 are indicated, respectively, by reference numerals 83 and 81. When the cam follower 76 is located in the upper portion 80 as shown in FIG. 7, the jaws 44 and 46 are held in their open position by the drive lever 74. When the cam follower 76 moves from the upper portion 80 of the jaw operating cam track 78 to the lower portion 82, the drive lever 74 actuates the jaws 44 and 46 to their closed position as illustrated in FIG. 9. Thus, the drive lever 74 is operable in response to relative movement between the jaw operating cam 78 and cam follower 76 to actuate the jaws 44 and 46 between their open and closed positions. Position 83 may thus be defined as a carton closing station along cam track 78 since movement of cam follower 76 from surface 80 to surface 82 past position 83 causes the jaws 44 and 46 to close.

The latch member 50 is mounted on the supporting wall by latch member mounting means in such a manner that the latch member is movable between a locked position with respect to the jaws 44 and 46 in which the latch member 50 engages jaw 46, as shown in FIG. 9, in the closed position of the jaws 44 and 46, to prevent movement of the jaws from the closed position, and a released position with respect to the jaws, as shown in FIG. 7, in which the latch member does not interfere with movement of the jaws from their closed to open position. The latch member includes a block 84 on one end of a support arm 86. The latch member mounting means includes a bracket 87 welded or otherwise secured to the supporting wall 34 and having an upstanding bracket arm 88 mounted thereon. The latch member support arm 86 is pivotally mounted onto the bracket arm 88 by a pivot pin 90. Depending from the block portion 84 of the latch member 50 is a locking flange 92. A guide pin 94 projects upwardly from the bracket 87 and extends through a slot 95 formed in the support arm 86. Locking nuts 96 are threaded onto the upper end of the guide pin 94 to limit the upward movement of the support arm 86. A helper spring 98 is illustrated in FIGS. 7 and 9, one end of which is seated in a recess in bracket 87, and the other end of which engages the underside of the support arm 86 to bias the latch member 50 to its released position illustrated in FIG. 7.

Mounted on the upper end of the support lever 60 is a locking flange support pad 100 for slidably supporting the locking flange 92 when the jaws are in their open position, or any position between the open and closed position. As the jaws 44 and 46 move to the open position, the engagement of the support pad 100 with the locking flange 92 causes counterclockwise movement of the support arm 86 about pin 90 as viewed in FIG. 7. When the jaws 44 and 46 are in the closed position illustrated in FIGS. 8 and 9, the locking flange 92 engages a backing plate 102 mounted on lever 60 and prevents clockwise movement of lever 60, and hence opening movement of the jaws 44 and 46. The engagement of the locking flange 92 with the lever 60 as shown in FIG. 9 provides additional backing for the anvil jaw 46 during the welding operation when the horn 54 is in the extended, active position shown in FIG. 9. As shown in FIG. 6 in connection with the carton closing and sealing unit 38e, the plate 102 has an extension 103 disposed beneath the trailing end of the locking flange support pad 100. As the jaws move to the closed position of FIG. 9, the locking flange 92 slides off the trailing end 99 of the support pad 100 and engages the rear surface of the extension 103 to lock the lever 60, and hence the jaws 44 and 46 in the closed position and provide additional back-up for the welding operation when the horn 54 is in the extended position as shown in FIG. 9.

The jaw 46 is of heavier material than the jaw 44 to serve as the anvil for the welding operation, and is secured to an outwardly extending arm portion 109 on lever 60 by fasteners 108. The jaw member 46 may be slotted to receive the fasteners 108 so that it can be adjusted in the direction of the arrows 47 in FIG. 7. Adjustable set screws are mounted in plate 102 and engage the end of the anvil jaw 46 opposite the anvil surface 48 in the desired adjusted position of jaw 46 on arm 109. Lock nuts 106 are threaded onto the set screws 104 to lock the set screws in a selected position in plate 102.

The jaw 44 is secured to an arm 109 at the upper end of the support lever 62 by fasteners 110. The jaw member 44 in the illustrated embodiment is of much lighter material than the anvil jaw 46, and may also be mounted on the arm 109 for adjustment toward and away from the jaw 46 as desired.

With reference to FIGS. 6 and 7, a latch member cam follower roller 116 is rotatably mounted on the arm 114 of a bracket 112 secured to block 84 of the latch member 50. The latch member cam follower 116 is engageable with the lower cam surface of an elongated latch member holding cam 118 upon relative movement between the latch member 50 and the latch member holding cam when the latch member is in its locked position and the jaws are in their closed positions, the engagement between the latch member holding cam 118 and latch member cam follower 116 holding the latch member against movement from its locked position.

Figure 10:
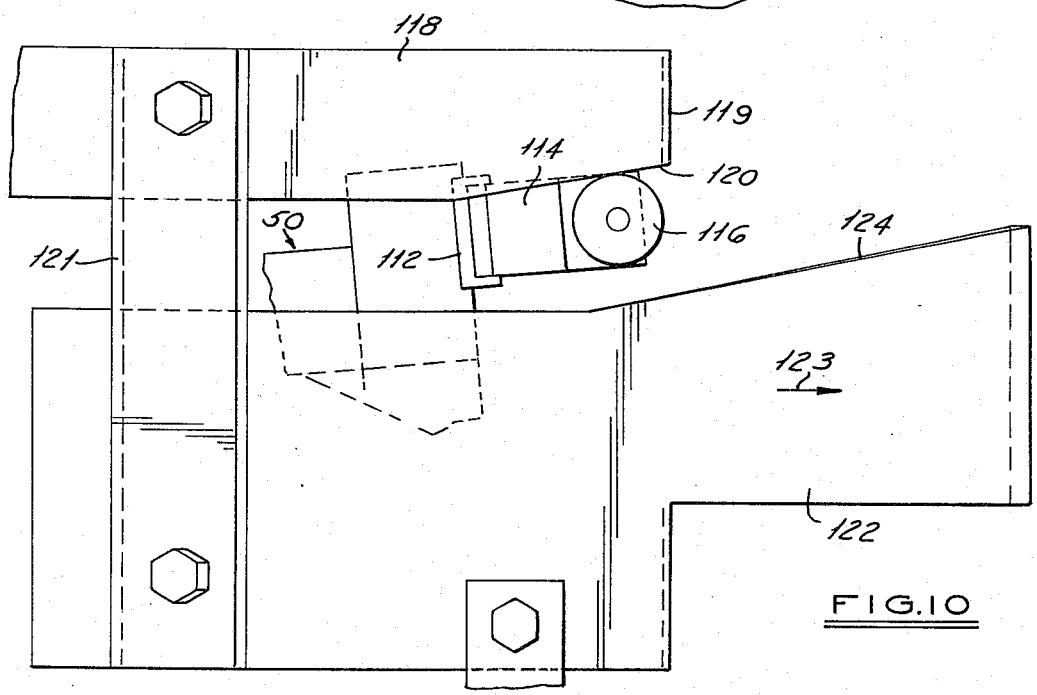
FIG. 10 is an elevational view of the latch member release cam and a portion of the latch member holding cam of the apparatus of FIG. 6.

The holding cam 118 has a leading end 117 and a trailing end 119 as shown in FIG. 11. With reference to FIG. 10, the lower cam surface of the holding cam 118 is received near the trailing end 119 as indicated at 120 to permit movement of the latch member 50 toward its released position as the cam follower 116 approaches the trailing end 119. Connected with the holding cam 118 by a support member 121 is a latch member release cam 122 having an upwardly inclined cam surface 124 engageable with the latch member cam follower 116 in response to movement of the latch member 50 in the direction of arrow 123 in FIG. 10 with respect to the release cam 122 to actuate the latch member to its released position. The upwardly inclined surface 124 of the latch member release cam prevents the latch member 50 from remaining in its locked position as the latch member cam follower 116 moves along the surface 124.

Each of the vibration welding devices 52 is supported on a mounting bracket 126 welded or otherwise secured to the side wall 34 of the drum 36. Each of the mounting brackets 126 includes an inclined support plate 128 (FIG. 12A), and the housing for each welding device 52 is secured to the plate 128 by fasteners 129. The inclination of plate 128 is such that the working surface 56 of the horn 54 is substantially parallel to the anvil surface 48 of its associated anvil jaw 46 when the jaws 44 and 46 are in the closed position.

In FIG. 11, a carton receiving station is designated generally by reference numeral 130, the radial line 130a intersecting the receiving station 130. Reference numeral 133 designates a horn actuating station, station 133 being intersected by a radial line 133a. Reference numerals 134 and 136 respectively designate a welding station and a horn retracting station, stations 134 and 136 being intersected by radial lines 134a and 136a, respectively. The radial lines 134a and 136a also define the approximate locations of the ends of a welding and dwell portion of the path of movement of the units 38 around the axis of drum 136. Reference numeral 132 designates a carton delivery station, the carton delivery station being intersected in FIG. 11 by a radial line 132a.

Still referring to FIG. 11, as the drum rotates counterclockwise as indicated by arrow 137, each carton closing and sealing unit receives a carton with an open end at the carton receiving station 130 and carries it to the carton delivery station 132. When the carton is in the receiving station 130, the jaws 44 and 46 are in the open position because the jaw operating cam follower 76 is on surface 80 of the cam track. When the cam follower 76 moves from surface 80 onto surface 82 past the junction point 83, the jaws are caused to close by the actuating lever 74, and the jaws remain closed until the cam follower passes the junction point 81 between surface 82 and surface 80 to again open the jaws 44 and 46. When the cam follower 76 moves from surface 80 onto surface 82 past point 83 to close the jaws, the latch member 50 moves to its locked position, the the latch member cam follower 116 engages the underneath surface of the holding cam 118 as it moves past the leading end 117 thereof. The jaws 44 and 46 are thus maintained in their closed position, and the latch member 50 in its locked position, until the latch member cam follower 116 moves past the exit end 119 of the holding cam 118, and engages the surface 124 of the release cam 122. As illustrated in FIG. 11, the holding cam 118 circumscribes an arc of approximately 190° between its ends 117 and 119.

As is described in greater detail below, when a carton is received at the carton receiving staion 130, it is then carried past the horn actuating station 133 where a control means responsive to the movement of the carton past station 133 initiates a welding cycle. When the carton reaches station 134, the horn extends into engagement with the carton (as shown in FIG. 9) and vibrates and generates heat sufficient to activate the thermoplastic material of the layers along band 28 (FIG. 4) clamped between the horn and anvil surface 48 to flow as the carton moves beyond station 134 toward station 136. At a portion of the path defined between stations 134 and 136 intermediate stations 134 and 136, the horn is deenergized by the control means but remains in engagement with the carton sealing strips 22–25 and anvil 48 (the position shown in FIG. 9) as it continues to move toward station 134 to permit the activated thermoplastic material to cool and set and weld the layers together along band 28 and form a seal. When the horn reaches station 136, it is caused to retract to the position shown in FIG. 8, and in full lines in FIG. 12B. When the carton reaches the delivery station 132, it is removed from the carton carrying brackets 40 and 42, the jaws 44 and 46 having been previously actuated to the open position by movement of the cam follower 76 onto the cam surface 80 past the junction point 81.

With reference to FIG. 12B, the cam track 78 is defined on a cam member having upper and lower plates 138 and 140 nonrotatably mounted on a stationery support post 142 in axially spaced relationship with each other, the cam track 78 being defined between plates 138 and 140. Post 142 is secured at its lower end to a base 146 by a support member 144. A sump housing 150 for lubricating oil is mounted on the lower end of the post. The lower end of a sleeve 148 is seated on the inner wall of the housing 150, and the inner race of a bearing assembly 152 is supported on the upper end of sleeve 148. The lower end of a sleeve 154 is supported on the inner race of the bearing assembly 152, and the inner race of a bearing assembly 156 is supported on the upper end of sleeve 154. A drive sleeve 158 has upper and lower support rings 160 and 162, respectively, welded thereto. The upper support ring 160 is supported on the inner race of the bearing assembly 156 by a retaining ring 161. The lower support ring 162 engages the outer race of the bearing assembly 152 such that the drive sleeve 158 is rotatably mounted on the post 142.

Secured to the ring 162 by a fastener 164 is a drive sprocket 166. Sprocket 166 is connected by a drive chain 168 with a source of power such that rotation of sprocket 166 in turn causes rotation of the drive sleeve 158.

Welded onto the drive sleeve 158 intermediate its ends is a flange 170 which in turn is secured by bolts 172 to an annular base plate 174 welded to the lower end of the side wall 34 of drum 36. The inner race of a bearing assembly 176 is secured between a shoulder on flange 170 and the annular base plate 174. The outer race of the bearing assembly 176 is supported on a stationary base assembly 178. Hence, when power is transmitted through the chain 168 to sprocket 166, rotation is transmitted from sprocket 166 through the drive sleeve 158 to the drum 36. Thus, the drum 36 rotates about the axis of post 142, the stationary cam plates 138 and 140 defining cam track 78 that is stationary with respect to the rotating drum.

With reference to FIG. 6, the drum 36 is driven in timed relationship with a feed conveyor 180 and a discharge conveyor 181. The feed conveyor 180 comprises a chain having one end mounted on a sprocket 182 driven in a clockwise direction as indicated by arrow 183 in FIG. 6. The discharge conveyor 181 is also driven in a clockwise direction as viewed in FIG. 6 as indicated by arrow 188. In FIG. 6, as indicated by arrow 137, the drum 36 is driven to rotate in a counterclockwise direction.

Mounted on the conveyor chain 180 are carton pusher members 184 for advancing cartons toward the carton receiving station 130. When a pusher member 184 moves a carton into the carton receiving station 130, the carton is engaged by the set of carton carrying brackets 40 and 42 mounted on drum 36 and located at the carton receiving station 130 so that the cartons are transferred from the conveyor 180 to the carton carrying members 40 and 42 of drum 36. A guide rail 187 assists in transferring the cartons from the pusher member 184 to members 40 and 42.

When the cartons reach the carton delivery station 132, they are each engaged by a set of the members 190 and 191 of the discharge conveyor 181, the transfer from the carrying members 40, 42 to members 190 and 191 being assisted by guide rails 192. As the cartons move from the carton receiving station 130 to the carton delivery station 132, they are supported vertically by one or more support rails 194 (FIGS. 7 and 9). Radial outward movement of the cartons with respect to the axis of rotation of the drum 36 is prevented by the guide rail 187.

As a carton moves from the receiving station 130 to the delivery station 132, it moves in a path which sequentially carries it through the horn actuating position 133, the welding and dwell portion between stations 134 and 136 which welding and dwell portion terminates short of the delivery station, and then to the carton delivery station 132. The apparatus includes control means operable when connected to a power source in response to movement of the carton through the horn actuating position 133 to initiate a welding cycle to sequentially (1) actuate the horn to extend from its retracted position (FIG. 8) to its extended position (FIG. 9) as the carton reaches the welding and dwell portion at station 134, and energize the horn to vibrate and activate the thermoplastic material of the layers of the carton end received between the horn and anvil to flow as the carton travels along the welding and dwell portion, (2) deenergize the horn while still in its extended position and while the carton is still moving along the welding and dwell portion between stations 134 and 136 until the carton reaches the end of the welding and dwell portion at station 136, and (3) actuate the deenergized horn to return to its retracted position as the carton moves past station 136.

Figure 12A:
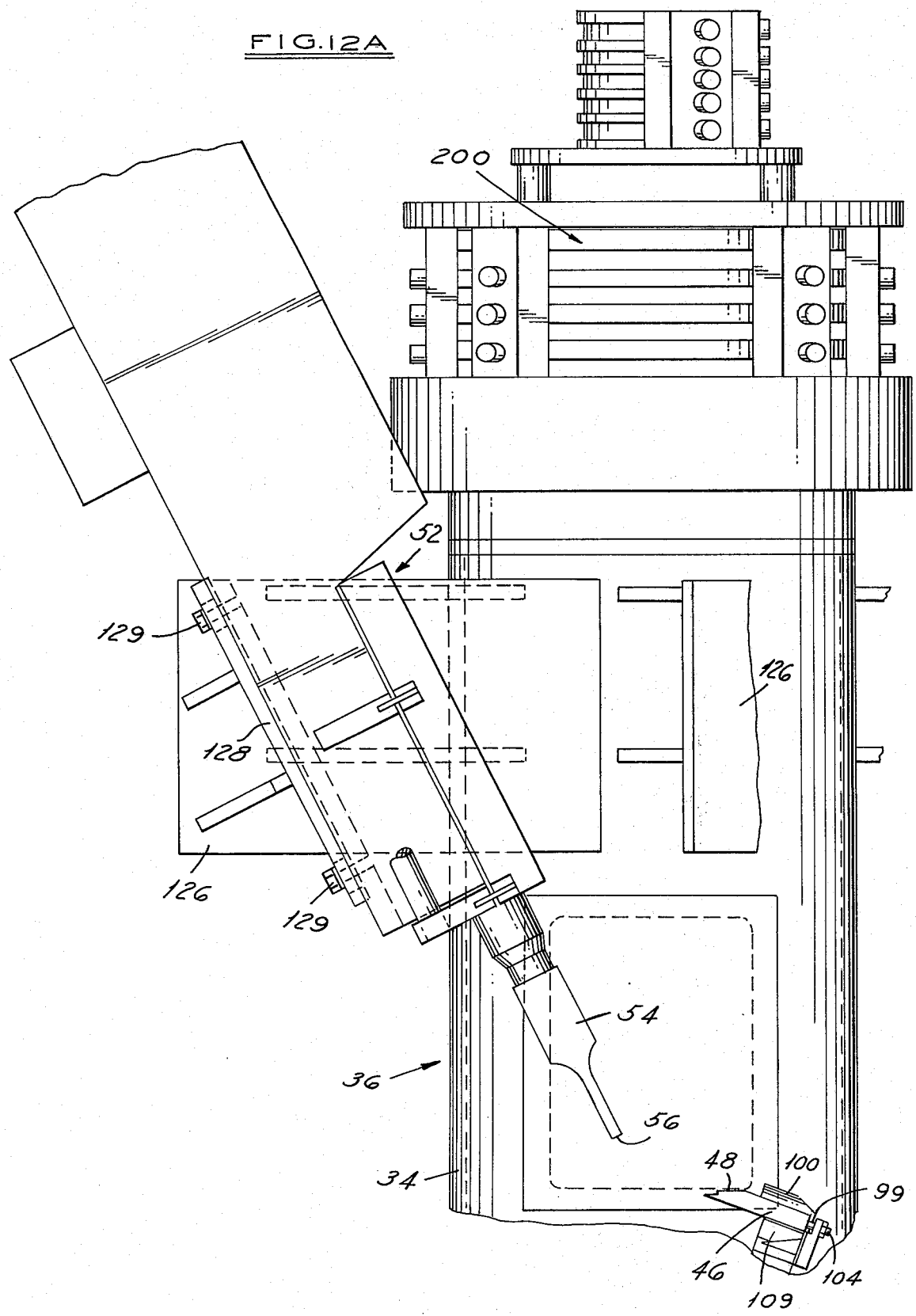

The specific control means is not a part of the present invention, and may take several forms. In FIG. 12A, a part of the control means is indicated by reference numeral 200 and includes a plurality of slip rings connected with the individual vibration welding devices 52 and with a control switch 202 at station 133 (FIGS. 8 and 11). The control switch 202 has an operating handle 204 engageable by a carton as the carton moves past station 133. When the control means is connected with a power source, and a carton actuates the operating handle 204 of the control switch 202, the associated vibration welding device is actuated to cause the horn 54 thereof to extend and engage the carton as shown in FIG. 9 when the carton reaches station 134. Thus, when the control system is connected with a power source, and a carton actuates the control switch 202, the vibration welding device of the units 38a, b, c, d or e associated with the carton moving past station 133 is actuated to sequentially extend and energize its horn 54 to engage and vibration weld the sealing strips 22 and 25 of the carton together (FIG. 9), deenergize the horn after a preselected period of time and after movement along a preselected length of the welding and dwell portion of the path between stations 134 and 136 with the deenergized horn remaining in the position shown in FIG. 9 to permit the activated thermoplastic material to cool and set, and retract the horn as the carton moves past station 136 in FIG. 11.

As the carton moves from station 136 to the delivery station 132, the latch member 50 is actuated to its released position by engagement of the latch member cam follower 116 with surface 124 of the release cam 122, and the jaws 44 and 46 are caused to open by movement of the cam follower 76 from cam surface 82 onto cam surface 80 of the cam track 78. The carton is carried away from the delivery station by the members 190 and 191 of the discharge conveyor 181 (FIG. 6), the transfer of the cartons from the carton carrying brackets 40 and 42 being assisted by the guide rails 192 in FIG. 6.

In order to prevent actuation of a horn 54 when a carton does not become properly positioned in the carton carrying brackets 40 and 42 at the receiving station 130, or when no carton is present as the carton carrying brackets 40 and 42 of one of the units 38 passes the receiving station, carton sensing means is provided to control the connection between the control means for the vibration welding devices and the power source so that the welding cycle for that unit will not be initiated unless a carton is properly positioned between the open jaws 44 and 46 in the carton carrying brackets 40 and 42 at the receiving station 130.

The carton sensing means comprises a photosensitive switch connected in series with the actuator switch 202 so that the photosensitive switch must be actuated by a carton properly positioned in the carton carrying brackets 40 and 42 at the receiving station 130 in order to connect the switch 202 with the power source (not shown). The photosensitive switch includes a housing 208 for a light source that projects a light beam 210 onto a photodetector switch 212. When the light beam 210 impinges on the photodetector switch 212, the actuator switch 202 is disconnected from the power source. When a carton moves into the receiving station 130 as shown in FIG. 6 with the open end properly positioned between the open jaws 44 and 46, of the carton closing and sealing unit 38a, for example, the flap 26 of carton C interrupts the light beam 210 which, in turn, causes the photodetector switch to close the circuit between the actuator switch 202 and the power source. As the carton then moves past station 133 and actuates the handle 204 of switch 202, the circuit is completed between the control means for the vibration welding device 52 of unit 38a to initiate a welding cycle for the vibration welding device 52 of unit 38a as described above. Thus, the photosensitive switch 208, 212 assures that the horns 54 of the carton closing and sealing units 38a–e will not extend and engage the associated anvil surfaces 48, 48a unless a carton end is properly folded and positioned against the anvil surface.

Each of the vibration welding devices 52 of the five carton closing and sealing units 38a, b, c, d and e are electrically connected with the slip ring assembly 200 such that they are sequentially operated by actuation of switch 202 as a carton associated therewith moves past the horn actuating station or position 133 to actuate switch 202. The photo switch 208, 212 assures that a vibration welding device 52 will not be actuated unless a carton is properly positioned between the jaws 44 and 46 so that the horn 54 will not extend into engagement with the bare anvil surface 48 or 48a, that is, the horn 54 will not extend unless the layers of the carton end are disposed to be engaged on one surface by the anvil surface 48, 48a when the horn extends to cause its working surface 56 to engage the other surface of the layers of the carton end.

In the illustrated apparatus, the carton top ends are closed and sealed as the cartons are carried from the receiving station 130 to the delivery station 132 by the drum 36. The drum 36, and the five carton closing and sealing units 38a, b, c, d and e mounted thereon, are incorporated into a system including a feed conveyor 180 and the delivery conveyor 181 (FIG. 6). When the cartons reach the carton receiving station 130, they have already been erected from a flat blank condition with the bottom closed and sealed, such as, for example, by apparatus disclosed in U.S. Pat. No. 3,905,280. After the bottom closing and sealing operation, the cartons C, with the top end closure in the fully opened position shown in FIG. 1, then undergoes a prebreaking and filling operation by apparatus, for example, of the type disclosed in U.S. Pat. No. 3,910,014. The feed conveyor 180 moves the cartons that have been filled and that have undergone a prebreaking operation into the carton receiving station 130 with the top end closure approximately in the condition illustrated in FIG. 2. In FIG. 6, during operation, the feed conveyor 180, drum 36, and delivery conveyor 132 are continuously moving in timed relationship with each other such that a carton pusher member 184 of conveyor 180 reaches the receiving station 130 at the same time as a set of the carton carrying brackets 40 and 42 on the wall 34 of drum 36 reach the carton receiving station 130. As a carton C moves into the brackets 40 and 42 at the receiving station 130, the photosensitive switch is adjusted such that the light beam 210 is interrupted by the flap 26 or another portion of the top end closure when the top end closure is properly positioned at the receiving station. If the top end closure is damaged or distorted in such a way that it does not interrupt the light beam 210, the associated vibration welding device 52 will not be actuated as the carton subsequently is carried past station 133 to actuate switch 202. Similarly, if no carton is picked up by the brackets 40 and 42 at the receiving station 130, the light beam 210 will not be interrupted, and the associated vibration welding device 52 will not be actuated to undergo a welding cycle during that cycle of its movement around the axis of the drum 36.

The sequence of operations and positions of the parts at various positions along the path of movement from the receiving station 130 to the delivery station 132 are shown in FIGS. 7, 8 and 9. FIG. 7 illustrates the position of the parts at the carton receiving station with the direction of movement of the side wall 34 of the drum being indicated by arrow 137. As the jaw operating cam follower 76 moves from surface 80 of the cam track 78 past position 83 to surface 82, the jaws 44 and 46 close to fold the end closure panels 6 and 7 together with the sealing strips 22 and 25 disposed adjacent the anvil surface 48a as illustrated in FIG. 8. Closing of the jaws 44 and 46 causes the locking flange 92 to slide past the trailing end 99 of the support pad 100 so that the locking flange 92 engages the portion 103 of plate 102. The latching member cam follower 116 engages the underneath side of the latching member cam 118 as the cam follower 116 moves past the end 117 of the cam 118 (FIG. 11).

FIG. 8 illustrates the position of the parts after the carton has just moved past station 133 and actuated the switch 202 by the engagement of the carton with the switch actuator 204. In FIG. 8, the horn 54 is still in its retracted position, and the latching member 50 is securely held in its locked position to brace the anvil jaw 46 against the force of the horn 54 when the horn 54 extends due to the engagement of the cam follower 116 with the underneath surface of cam 118.

FIG. 9 illustrates the position of the parts as the carton moves between station 134 and 136 (FIG. 11). The horn is extended and during the initial movement of the carton along the welding and dwell portion between stations 134 and 136, the horn 54 is energized to vibrate and activate the thermoplastic coating of the sealing strips 18, 22 and 25 (FIGS. 1 and 2) to flow. The horn 54 is energized to vibrate just long enough to generate heat sufficient to activate the thermoplastic coating, after which the horn is deenergized and remains in the position of FIG. 9 until the carton reaches station 136, where upon the horn retracts. The position of the parts at the receiving station 132 is illustrated in FIG. 6 in connection with the unit 38e. The jaws 44 and 46 have returned to the open position, the horn 54 is in its retracted position, and the latch member 50 is in its released position so that a carton can be transferred from the carton carrying brackets 40 and 42 to the brackets 190 and 191 of the discharge conveyor 181.

In FIG. 11, the carton closing and sealing unit 38a is located at the carton receiving station 130, and the parts thereof are in the position illustrated in FIG. 7. The unit 38b has moved to the horn actuating station 133, and the parts are in the position illustrated in FIG. 8, except that in FIG. 8 the carton has moved past the station 133. Unit 38c is at station 134 at the beginning of the welding and dwell portion of the path, and the parts are in the position shown in FIG. 9, with the horn 54 energized and vibrating. Unit 38d is at station 136 at the end of the welding and dwell portion of the path with the parts in the position shown in FIG. 9, except that the horn 54 has been deenergized and has stopped vibrating, and will retract as it moves past station 136. Thus, each of the carton closing and sealing units 38a, b, c, d and e includes a vibration welding device 52, a pair of jaws 44 and 46 with one jaw comprising an anvil jaw formed with an anvil surface 48, 48a, a cam follower and lever assembly 74, 76, 60, 68, 62 etc. for opening and closing the jaws, and a latch member for locking the jaws in their closed position and providing additional back-up for the horn 54 of the vibration welding device. Each unit 38a, b, c, d and e operates to pick up an open ended carton at the receiving station and carry the carton to the delivery station while simultaneously closing and sealing the end of the carton with each revolution of the drum 36.

While a specific form of the invention is illustrated in the accompanying drawings and described in the foregoing specification, it should be understood that the invention is not limited to the exact construction shown. To the contrary, various alterations in the construction and arrangement of parts, all falling within the scope and spirit of the invention, will become apparent to those skilled in the art.

The embodiments of the present invention in which an exclusive property or privilege is claimed are defined as follows:

1. Apparatus for closing and sealing the open end of a carton of thermoplastic coated paperboard material or the like, said apparatus comprising: a pair of jaws, at least one of said jaws having an anvil surface formed thereon for supporting one outer surface of the layers of an end of a carton to be sealed; means supporting said jaws for movement with respect to each other between an open position to cause the open end of a carton received therebetween to be folded closed with one outer surface of the layers of the closed carton end being disposed to engage said anvil surface of said one jaw; vibration welding means including a horn that vibrates at a predetermined frequency when energized; said horn being movable relative to said jaws between a retracted inactive position and an extended sealing position, said horn having a work surface that engages the opposite outer surface of the layers of a closed carton end received between said jaws in their closed position to clamp the layers of the closed end between the work surface of the horn and the anvil surface of said one jaw to weld the clamped layers together upon vibration of said horn; and a latch member supported for movement between a locked position engaging said one jaw in the closed position of said jaws for locking said jaws against movement from their closed position, and a released position disengaged from said one jaw to permit movement of said jaws from their closed position to their open position.

2. Apparatus as claimed in claim 1 further including jaw operating cam means connected with said jaws and operable in response to relative movement between said jaws and jaw operating cam means to actuate said jaws to open and close.

3. Apparatus as claimed in claim 2 further including holding cam means engageable with said latch member in response to relative movement between said latch member and holding cam when said jaws are in their closed position to prevent said latch member from moving from its locked position to its released position.

4. Apparatus as claimed in claim 3 further including release cam means engageable with said latch member in response to relative movement between said latch member and release cam means subsequent to disengagement of said holding cam means from said latch member to actuate said latch member to its release position.

5. Packaging apparatus for transferring cartons from one location to another while simultaneously closing and sealing one end of the carton, said apparatus comprising: means defining a carton receiving station at one location; means defining a carton delivery station at another location; carton carrying means operable to engage a carton at the receiving station and carry the carton to the delivery station; carton closing and sealing means operatively associated with said carrying means operable to close an open end of the carton and then weld the layers of the closed end together as the carton is carried by the carrying means from the receiving station to the delivery station; said carton closing and sealing means including vibration welding horn movable between active and inactive positions, and a pair of closing jaws movable between open and closed positions with respect to each other, said closing jaws being in their open open position at the receiving station and moving to their closed position to close the open end of a carton as the carton moves from the receiving station toward the delivery station, one only of said jaws constituting an anvil jaw and having an anvil surface formed thereon; said horn being in its inactive position when a carton engaged by said carrying means is at the receiving station, said horn being movable to its active position subsequent to movement of said jaws to their closed position to close the open end of a carton received therebetween, said horn in its active position cooperating with the anvil surface of said one jaw only to hold the closed end of the carton between said horn and said anvil surface of said one jaw such that vibration of said horn upon energization thereof welds the layers of the open end of the carton together.

6. Apparatus as claimed in claim 5 wherein said carton closing and sealing means further includes a latch member having a released position permitting said jaws to move to their open positions, and a locked position engaging said one jaw to prevent said one jaw from moving from its closed position, said latch member moving from its released position to said locked position in response to closing movement of said jaws as said jaws move from said receiving station to close the open end of a carton such that said one jaw is locked against movement from its closed position by said latch member when said horn moves to its active position to weld the layers of a closed end of a carton together.

7. Apparatus as claimed in claim 6 further including a cam follower on said latch member, and a holding cam located between said receiving station and delivery station engageable by said cam follower to prevent movement of said latch member to its released position until a carton associated therewith reaches said delivery station.

8. Apparatus as claimed in claim 6 further including a release cam for said latch member located at said delivery station and engageable by said cam follower to actuate said latch member to its released position as a carton associated therewith reaches the delivery station.

9. Apparatus as claimed in claim 8 further including a closing jaws cam extending between said receiving station and delivery station, a cam follower on said closing jaws engaged with said closing jaws cam and cooperating with said closing jaws cam to cause said jaws to move from their open positions with respect to each other at said receiving station to said closing position as the jaws move from the receiving station and to return to the open position as the jaws reach said delivery station.

10. Apparatus as claimed in claim 9 including a pivot pin rotatably mounted on said carton carrying means, said one jaw being non-rotatably mounted on said pivot pin, a cam follower link non-rotatably mounted on said pivot pin, said cam follower being mounted on said cam follower link at a location spaced from said pivot pin, said other jaw being pivotally mounted on said carton carrying means, and a connecting link having one end pivotally connected with said one jaw and its other end pivotally connected with said other jaw for transmitting motion from said one jaw to said other jaw.

11. Apparatus as claimed in claim 10 wherein the path of movement of a carton from said receiving station to said delivery station includes a horn actuating position between said receiving station and delivery station, and a welding and dwell portion, said welding and dwell portion being located between said actuating position and delivery station and extending along a portion of said path and terminating short of said delivery station; and further including control means operable when connected to a power source in response to movement of a carton through said actuating position to actuate said horn to sequentially move from its inactive position to its active position as said carton reaches said welding and dwell portion, vibration weld together the layers of the carton end received between said horn and anvil, deenergize the horn in its active position such that the horn holds the welded layers together until the carton reaches the end of the welding and dwell portion of said path, and return to its inactive position when the carton reaches the end of said welding and dwell portion of said path.

12. Apparatus as claimed in claim 11 further including sensing means for controlling the connection between said control means and a power source, said sensing means being operable to connect the control means with the power source only when a carton is properly positioned on said carrying means at said receiving station prior to movement of such carton to said actuating position.

13. Apparatus as claimed in claim 12 wherein said control means includes a carton actuated switch having a control arm engageable by a carton moving through said actuating position, and said sensing means comprises a photosensitive switch connected in series between a power source and said carton actuated switch; said photosensitive switch comprising a photodetector located on one side of said receiving station and a light source located on the other side of said receiving station for projecting a beam of light onto said photodetector, said beam of light being interrupted by the open end of a carton engaged by said carrying means and properly positioned in said receiving station.

14. Apparatus as claimed in claim 14 wherein said carton carrying means comprises a powered rotatable drum having a cylindrical wall surrounding the axis of rotation of said drum.

15. Apparatus as claimed in claim 14 wherein said jaw operating cam is stationary and is surrounded by said cylindrical wall of said drum.

16. Apparatus as claimed in claim 15 wherein said holding cam is stationary and is located externally of said cylindrical wall of said drum.

17. Apparatus as claimed in claim 16 further including a U-shaped carton holder carried by said drum for receiving a carton at said receiving station and laterally supporting said carton as the carton is carried to said delivery station.

18. Apparatus as claimed in claim 17 further including a stationary guide rail located externally of said cylindrical wall, said guide rail extending from said receiving station to said delivery station in concentric relationship with the axis of rotation of said drum for restraining cartons carried by said carton carrying member against radial outward movement with respect to said drum.

19. Apparatus as claimed in claim 18 further including a support rail extending around the axis of said drum externally of said side wall for vertically supporting cartons carried by said drum as the cartons move from the receiving station to the delivery station.

20. Apparatus as claimed in claim 19 further including a feed conveyor for feeding cartons into said delivery station in timed relationship with said U-shaped members on said drum.

21. Apparatus as claimed in claim 20 further including a delivery conveyor for removing cartons from said drum at said delivery station in timed relationship with said U-shaped carton carrying members.

22. Apparatus for closing and sealing the open end of a carton of thermoplastic coated paperboard material or the like, said apparatus comprising: a pair of jaws, at least one of said jaws having an anvil surface formed thereon for supporting one outer surface of the layers of an end of a carton to be sealed; means supporting said jaws for movement with respect to each other between an open position to cause the open end of a carton received therebetween to be folded closed with one outer surface of the layers of the closed carton end being disposed to engage said anvil surface of said one jaw; vibration welding means including a horn that vibrates at a predetermined frequency when energized; said horn being movable relative to said jaws between a retracted inactive position and an extended sealing position, said horn having a work surface that engages the opposite outer surface of the layers of a closed carton end received between said jaws in their closed position to clamp the layers of the closed end between the work surface of the horn and the anvil surface of said one jaw to weld the clamped layers together upon vibration of said horn; said means supporting said jaws for movement between open and closed positions comprising: a supporting wall, a first support lever secured to said one of said jaws; a second support lever secured to the other of said jaws; a first pivot pin pivotally supporting said first support lever on said supporting wall; a second pivot pin spaced from said first pivot pin pivotally supporting said second support lever on said supporting wall; and a motion transmitting link having one end pivotally connected with said first support lever at a location spaced from said first pivot pin and its other end pivotally connected with said second support lever at a location spaced from said second pivot pins such that pivotal movement of said first support lever in one direction about said first pivot pin causes said jaws to move in an opening direction with respect to each other, and pivotal movement of said first support lever in the opposite direction about said first pivot pin causes said jaws to move in a closing direction with respect to each other.

23. Apparatus as claimed in claim 22 wherein said first support lever is nonrotatably secured to said first pivot pin and said first pivot pin is rotatably with respect to said supporting wall, and including a drive lever nonrotatable secured to said first pivot pin, and jaw operating means for actuating said drive lever to cause pivotal movement of said first and second support lever.

24. Apparatus as claimed in claim 23 wherein said jaw operating means includes a jaw operating cam follower on said drive lever and a jaw operating cam means engaged with said jaw operating cam follower, said drive lever being operable in response to relative movement between said jaw operating cam and cam follower to actuate said jaws between their open and closed positions.

25. Apparatus as claimed in claim 24 further including a latch member, and latch member mounting means mounting said latch member on said supporting wall for movement between (1) a locked position with respect to said jaws in which said latch member engages said one of said jaws in the closed position of said jaws to prevent movement of said jaws from said closed position, and (2) a released position with respect to said jaws in which said latch member does not interfere with movement of said jaws from their closed to open position.

26. Apparatus as claimed in claim 25 wherein said latch member mounting means comprises a bracket secured to said supporting wall; and a latch member pivot pin on said bracket; said latch member having a support arm pivotally mounted near one end thereof on said latch member pivot pin and a locking flange depending from the other end thereof for engagement with said one jaw in the closed position of said jaws to lock said jaws in said closed position.

27. Apparatus as claimed in claim 26 further including a locking flange support pad on said one jaw for slidably supporting said locking flange in any position of said jaws between the closed and open positions thereof such that said locking flange slides past said support pad out of engagement therewith and into locked engagement with said one jaw as said jaws move into their closed position from their open position.

28. Apparatus as claimed in claim 27 further including a latch member cam follower on said latch member, and a latch member holding cam engageable with said latch member cam follower upon relative movement between said latch member and latch member holding cam only when said latch member is in its locked position and said jaws are in their closed positions to hold said latch member against movement from its locked position.

29. Apparatus as claimed in claim 28 further including a latch member release cam engageable with said latch member cam follower in response to relative movement between said latch member and latch member release cam to actuate said latch member to its released position.

30. Apparatus as claimed in claim 29 including a welding means support bracket secured to said supporting wall, said welding means being mounted on said welding means support bracket.

31. Apparatus as claimed in claim 30 including control means operable only when said jaws are in their closed position with a carton end folded therebetween and the latch member in its locked position with the latch member cam follower engaged with the latch member holding cam to (1) actuate said horn to sequentially extend from its retracted inactive position to its extended sealing position and vibration weld the layers of the carton end clamped between the work surface of the horn and the anvil surface of said one jaw, (2) deenergize said horn to terminate the vibration thereof while maintaining the horn in its extended position for a predetermined period of time, and then (3) actuate said horn to its retracted, inactive position.

32. Packaging apparatus comprising: a support member; a cam member nonrotatably mounted on said support member having an endless cam track formed thereon and enclosing said support member; a drum rotatably mounted on said support member, said drum having a cylindrical sidewall enclosing said cam member; a plurality of carton closing and sealing units mounted on the sidewall of said drum; each of said carton closing and sealing units comprising; a pair of jaws movable between open and closed positions with respect to each other, one of said jaws having an anvil surface thereon; a vibration welding device including a horn that vibrates at a predetermined frequency when energized for cooperation with the anvil surface of said one jaw when said jaws are in the closed position; a latching member having a locked position engaging the jaws in the closed position of the jaws to prevent opening movement of the jaws and a released position to permit opening movement of the jaws; said cam track having an upper surface and a lower surface with a carton receiving station defined near the junction of one end of the upper surface and the lower surface and a carton delivery station near the junction of the other end of the upper surface and lower surface; a first support lever secured to said one of said jaws; a second support lever secured to the other of said jaws; a first pivot pin pivotally supporting said first support lever on said supporting wall; a second pivot pin spaced from said first pivot pin and pivotally supporting said second support lever on said supporting wall; a motion transmitting link having one end pivotally connected with said first support lever at a location spaced from said first pivot pin and its other end pivotally connected with said second support lever at a location spaced from said second pivot pin such that pivotal movement of said first support lever in one direction about said first pivot pin causes said jaws to move in an opening direction with respect to each other, and pivotal movement of said first support lever in the opposite direction about said first pivot pin causes said jaws to move in a closing direction with respect to each other; said first support lever being nonrotatably secured to said first pivot pin and said first pin being rotatable with respect to said sidewall of said drum; a drive lever nonrotatably secured to said first pivot pin; a jaw operating cam follower on said drive lever engaged with said cam track such that said drive lever is operable in response to relative movement between said jaw operating cam follower and cam track to actuate said jaws between their open and closed positions with the jaws being in the open position when said cam follower is on said upper portion of said cam track and said jaws being in the closed position when said cam follower is on the lower surface of said cam track.

33. Apparatus as claimed in claim 32 further including latch member mounting means mounting said latch member on the side wall of said drum for movement between said locked position with respect to said jaws in which said latch member engages said one of said jaws in the closed position of said jaws to prevent movement of said jaws from said closed position, and said release position with respect to said jaws in which said latch member does not interfere with movement of said jaws from their closed to open position; said latch member mounting means comprising a bracket secured to said side wall of said drum; and a latch member pivot pin on said bracket; said latch member having a support arm pivotally mounted near one end thereof on said latch member pivot pin and a locking flange depending from the other end thereof for engagement with said one jaw in the closed position of said jaws to lock said jaws in said closed position; and a locking flange support pad on said one jaw for slidably supporting said locking flange in any position of saw jaws between the closed and open positions thereof, such that said locking flange slides past said support pad out of engagement therewith and into locked engagement with said one jaw as said jaws move into their closed position from their open position.

34. Apparatus as claimed in claim 33 further including a latch member cam follower on said latch member, and a latch member holding cam partially surrounding said drum and being in engagement with said latch member cam follower after predetermined movement of said jaw operating cam follower from the upper surface of said jaw operating cam track at the receiving surface thereof onto the lower surface of said jaw operating cam track with said latch member in its locked position such that the engagement of said latch member cam follower with said latch member holding cam prevents said latch member from moving from its locked position.

35. Apparatus as claimed in claim 34 further including a latch member release cam engageable with said latch member cam follower upon disengagement of said latch member cam follower from said holding cam as said latch member and associated jaws approach the carton delivery station, said latch member release cam being operable to prevent said latch member from remaining in its locked position as the latch member and associated jaws move to the carton delivery station.

36. Packaging apparatus for transferring cartons from one location to another while simultaneously closing and sealing one end of the carton, said apparatus comprising: means defining a carton receiving station at one location; means defining a carton delivery station at another location; a rotatable drum operable to engage a carton at the receiving station and carry the carton to the delivery station; and carton closing and sealing means operatively associated with said drum operable to close an open end of the carton and then weld the layers of the closed end together as the carton is carried by the drum from the receiving station to the delivery station; said carton closing and sealing means including an anvil and a vibration welding horn, said anvil and horn being operable to sequentially engage opposite outer surfaces of the end of a carton that has been closed together as the carton moves from the receiving station toward the delivery station to weld the layers of the end of the carton together upon vibration of the horn; said horn being movable between a retracted, inactive position with respect to said anvil and an extended, active position with respect to said anvil in which active position said horn is cooperable with said anvil to clamp a closed carton end between the anvil and horn to weld the layers of the carton end together upon vibration of the horn; said carton closing and sealing means including a pair of jaws cooperable to close an open end of a carton as the carton moves from the receiving station to the delivery station said anvil constituting one of said jaws; said jaws being movable between an open position with respect to each other in which said jaws are spaced apart a distance sufficient to receive therebetween an open end of a carton, and a closed position in which the distance between said jaws is less than the distance therebetween in the open position, said jaws sequentially moving from the open position to receive the open end of a carton at said receiving station to the closed position to close the open end of the carton as the carton moves from the receiving station, and from the closed position to the open position as the carton approaches the delivery station; the path of movement of a carton from said receiving station to said delivery station including a horn actuating position between said receiving station and delivery station, and a welding and dwell portion, said welding and dwell portion being located between said actuating position and delivery station and extending along a portion of said path and terminating short of said delivery station; and further including control means operable, when connected to a power source, in response to movement of a carton through said horn actuating position to actuate said horn to sequentially extend from its retracted position to its extended position as said carton reaches said welding and dwell portion, vibration weld together the layers of the carton end received between said horn and anvil, de-energize the horn in its extended position such that the horn holds the welded layers together until the carton reaches the end of the welding and dwell portion of said path, and return to its retracted position when the carton reaches the end of said welding and dwell portion of said path.

37. Apparatus as claimed in claim 36 further including sensing means for controlling the connection between said control means and a power source, said sensing means being operable to connect the control means with the power source only when a carton is properly positioned on said carrying means at said receiving station prior to movement of such carton to said actuating position.

38. Apparatus as claimed in claim 37 wherein said control means includes a carton actuated switch having a control arm engageable by a carton moving through said actuating position, and said sensing means comprises a photosensitive switch connected in series between a power source and said carton actuated switch; said photosensitive switch comprising a photodetector located on one side of said receiving station and a light source located on the other side of said receiving station for projecting a beam of light onto said photodetector, said beam of light being interrupted by the open end of a carton engaged by said carrying means and properly positioned in said receiving station.

* * * * *